(12) United States Patent
Ooki

(10) Patent No.: US 9,449,155 B2
(45) Date of Patent: Sep. 20, 2016

(54) ENVIRONMENTAL CONDITION IDENTIFYING TYPE LICENSE CONSUMPTION SYSTEM AND METHOD, AND FUNCTION PROVIDING SERVER AND PROGRAM

(75) Inventor: Yasuomi Ooki, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 334 days.

(21) Appl. No.: 13/820,683

(22) PCT Filed: Sep. 12, 2011

(86) PCT No.: PCT/JP2011/070693
§ 371 (c)(1),
(2), (4) Date: Mar. 4, 2013

(87) PCT Pub. No.: WO2012/043205
PCT Pub. Date: Apr. 5, 2012

(65) Prior Publication Data
US 2013/0160137 A1 Jun. 20, 2013

(30) Foreign Application Priority Data
Sep. 28, 2010 (JP) ................................ 2010-217179

(51) Int. Cl.
*G06F 21/10* (2013.01)
*G06F 21/51* (2013.01)

(52) U.S. Cl.
CPC ............. *G06F 21/105* (2013.01); *G06F 21/10* (2013.01); *G06F 21/51* (2013.01)

(58) Field of Classification Search
CPC .......... G06F 8/60–8/68; G06F 21/10–21/128; G06F 21/44–21/445; G06F 21/50–21/55; G06F 21/57–21/577; G06F 2221/2135; H04L 2463/101
See application file for complete search history.

(56) References Cited

U.S. PATENT DOCUMENTS

| 5,260,999 A * | 11/1993 | Wyman ........................... 705/59 |
| 8,490,191 B2 | 7/2013 | Kuegler et al. |
| 2003/0084306 A1* | 5/2003 | Abburi .................... G06F 21/10 713/188 |

(Continued)

FOREIGN PATENT DOCUMENTS

| CN | 101473333 A | 7/2009 |
| JP | 2002-318692 A | 10/2002 |

(Continued)

OTHER PUBLICATIONS

Communication dated Jan. 6, 2014, issued by the State Intellectual Property Office of the People's Republic of China in corresponding Application No. 201180044564.X.

(Continued)

*Primary Examiner* — Linglan Edwards
*Assistant Examiner* — Kevin Bechtel
(74) *Attorney, Agent, or Firm* — Sughrue Mion, PLLC

(57) ABSTRACT

A license consumption system includes an information device on which application software operates based on a given license; and a function providing server which grants the license to the information device. The function providing server stores the license and an operating condition for granting the license, when attempting to start the application software, the information device transmits to the function providing server a licensing request of the application software and an operating environment of the information device, and the function providing server compares an operating condition of the application software corresponding to the requested license with the operating environment of the information device, and grants the license to the information device when the operating environment satisfies the operating condition.

4 Claims, 16 Drawing Sheets

SUPPORT CONDITION TABLE 001

| TABLE NUMBER 601 | EXAMPLE: TABLE 001 | | | |
|---|---|---|---|---|
| ITEM NUMBER 602 | EXAMPLE: 1 | EXAMPLE: 2 | EXAMPLE: 3 | EXAMPLE: 4 |
| ITEM NAME 603 | EXAMPLE: OS | EXAMPLE: SET SOUND SOURCE | EXAMPLE: CPU CLOCK | EXAMPLE: BROWSER VERSION |
| DETERMINATION CONDITION 604 | EXAMPLE: EQUAL TO | EXAMPLE: EQUAL TO | EXAMPLE: EQUAL TO OR GREATER THAN | EXAMPLE: EQUAL TO OR GREATER THAN |
| FIRST CONDITION VALUE 605 | EXAMPLE: NO OSV1 SP | EXAMPLE: NEC-HANDSET-V1 | EXAMPLE: 800 Hz | EXAMPLE: 6.0 |
| SECOND CONDITION VALUE 606 | EXAMPLE: OSV1 SP1 | EXAMPLE: NEC-HANDSET-V2 | EXAMPLE: - | EXAMPLE: - |

(56) References Cited

U.S. PATENT DOCUMENTS

2004/0015962 A1* 1/2004 Carbone et al. ............. 717/178
2005/0251488 A1* 11/2005 Saunders et al. ............ 705/59
2008/0200256 A1* 8/2008 Gagner et al. ............... 463/42
2009/0327825 A1* 12/2009 Natsuno et al. ............. 714/748

FOREIGN PATENT DOCUMENTS

| JP | 2003-22377 A | 1/2003 |
| JP | 2004-46708 A | 2/2004 |
| JP | 2005-190490 A | 7/2005 |
| JP | 2006-4072 A | 1/2006 |
| JP | 2006-59163 A | 3/2006 |
| JP | 2010-211784 A | 9/2010 |

OTHER PUBLICATIONS

Communication dated Mar. 20, 2015 from the State Intellectual Property Office of the People's Republic of China in counterpart application No. 201180044564.X.

* cited by examiner

FIG.5

LICENSE SUPPORT INFORMATION TABLE

| FUNCTION NUMBER 501 | | | |
|---|---|---|---|
| EXAMPLE: FUNCTION 001 | | | |
| FUNCTION NAME 502 | APPLICATION VERSION 503 | | SUPPORT CONDITION TABLE 504 |
| EXAMPLE: VOICE CALL | EXAMPLE: LESS THAN THE BELOW | EXAMPLE: 1.0.0.0 | EXAMPLE: TABLE 001 |
| | EXAMPLE: GREATER THAN THE ABOVE AND LESS THAN THE BELOW | | EXAMPLE: TABLE 001 |
| | | EXAMPLE: 2.0.0.0 | EXAMPLE: TABLE 001 |
| | EXAMPLE: GREATER THAN THE ABOVE | | EXAMPLE: TABLE 002 |
| | | | EXAMPLE: TABLE 002 |

FIG.6

SUPPORT CONDITION TABLE 001

| TABLE NUMBER 601 | EXAMPLE: TABLE 001 | | | |
|---|---|---|---|---|
| ITEM NUMBER 602 | EXAMPLE: 1 | EXAMPLE: 2 | EXAMPLE: 3 | EXAMPLE: 4 |
| ITEM NAME 603 | EXAMPLE: OS | EXAMPLE: SET SOUND SOURCE | EXAMPLE: CPU CLOCK | EXAMPLE: BROWSER VERSION |
| DETERMINATION CONDITION 604 | EXAMPLE: EQUAL TO | EXAMPLE: EQUAL TO | EXAMPLE: EQUAL TO OR GREATER THAN | EXAMPLE: EQUAL TO OR GREATER THAN |
| FIRST CONDITION VALUE 605 | EXAMPLE: NO OSV1 SP | EXAMPLE: NEC-HANDSET-V1 | EXAMPLE: 800 Hz | EXAMPLE: 6.0 |
| SECOND CONDITION VALUE 606 | EXAMPLE: OSV1 SP1 | EXAMPLE: NEC-HANDSET-V2 | EXAMPLE: - | EXAMPLE: - |

FIG.7

SUPPORT CONDITION TABLE 002

| | EXAMPLE: TABLE 002 | | | |
|---|---|---|---|---|
| TABLE NUMBER 701 | | | | |
| ITEM NUMBER 702 | EXAMPLE: 1 | EXAMPLE: 2 | EXAMPLE: 3 | EXAMPLE: 4 |
| ITEM NAME 703 | EXAMPLE: OS | EXAMPLE: SET SOUND SOURCE | EXAMPLE: CPU CLOCK | EXAMPLE: BROWSER VERSION |
| DETERMINATION CONDITION 704 | EXAMPLE: EQUAL TO | EXAMPLE: EQUAL TO | EXAMPLE: EQUAL TO OR GREATER THAN | EXAMPLE: EQUAL TO OR GREATER THAN |
| FIRST CONDITION VALUE 705 | EXAMPLE: NO OSV1 SP | EXAMPLE: NEC-HANDSET-V1 | EXAMPLE: 1000 Hz | EXAMPLE: 6.0 |
| SECOND CONDITION VALUE 706 | EXAMPLE: OSV1 SP1 | EXAMPLE: NEC-HANDSET-V2 | EXAMPLE: - | EXAMPLE: - |
| THIRD CONDITION VALUE 707 | EXAMPLE: OSV1 SP2 | EXAMPLE: NEC-HANDSET-V3 | EXAMPLE: - | EXAMPLE: - |

FIG.8

INFORMATION DEVICE ENVIRONMENT TABLE

| ITEM NUMBER 801 | EXAMPLE: 1 | EXAMPLE: 2 | EXAMPLE: 3 | EXAMPLE: 4 |
|---|---|---|---|---|
| ITEM NAME 802 | EXAMPLE: OS | EXAMPLE: SET SOUND SOURCE | EXAMPLE: CPU CLOCK | EXAMPLE: BROWSER VERSION |
| INFORMATION DEVICE ENVIRONMENT 803 | EXAMPLE: OSV1 SP2 | EXAMPLE: NEC-HANDSET-V3 | EXAMPLE: 1,000 Hz | EXAMPLE: 7.0 |

FIG.12

LICENSING ERROR DISPLAY (EXAMPLE)

[VOICE CALL] CANNOT BE USED BECAUSE CONDITION NECESSARY FOR USING [VOICE CALL] IS NOT SATISFIED.
LICENSE OF [VOICE CALL] IS NOT CONSUMED.

REASON
    [OS] IS [OSV1 SP2].
[OS] NEEDS TO SATISFY THE FOLLOWING CONDITION
    : SAME AS [NO OSV1 SP]
    : SAME AS [OSV1 SP1]

[SET SOUND SOURCE] IS [NEC-HANDSET-V3]
[SET SOUND SOURCE] NEEDS TO SATISFY THE FOLLOWING CONDITION
    : SAME AS [NEC-HANDSET-V1]
    : SAME AS [NEC-HANDSET-V2]

REASON

FIG.14

SUPPORT CONDITION TABLE 001 WITHIN APPLICATION

| | EXAMPLE: TABLE 001 | | | |
|---|---|---|---|---|
| TABLE NUMBER 1401 | | | | |
| ITEM NUMBER 1402 | EXAMPLE: 1 | EXAMPLE: 2 | EXAMPLE: 3 | EXAMPLE: 4 |
| ITEM NAME 1403 | EXAMPLE: OS | EXAMPLE: SET SOUND SOURCE | EXAMPLE: CPU CLOCK | EXAMPLE: BROWSER VERSION |
| DETERMINATION CONDITION 1404 | EXAMPLE: EQUAL TO | EXAMPLE: EQUAL TO | EXAMPLE: EQUAL TO OR GREATER THAN | EXAMPLE: EQUAL TO OR GREATER THAN |
| FIRST CONDITION VALUE 1405 | EXAMPLE: NO OSV1 SP | EXAMPLE: NEC-HANDSET-V1 | EXAMPLE: 800 Hz | EXAMPLE: 6.0 |
| SECOND CONDITION VALUE 1406 | EXAMPLE: OSV1 SP1 | EXAMPLE: NEC-HANDSET-V2 | EXAMPLE: - | EXAMPLE: - |

FIG.15

SUPPORT CONDITION TABLE 002 WITHIN APPLICATION

| | EXAMPLE: TABLE 002 | | | |
|---|---|---|---|---|
| TABLE NUMBER 1501 | EXAMPLE: 1 | EXAMPLE: 2 | EXAMPLE: 3 | EXAMPLE: 4 |
| ITEM NUMBER 1502 | EXAMPLE: OS | EXAMPLE: SET SOUND SOURCE | EXAMPLE: CPU CLOCK | EXAMPLE: BROWSER VERSION |
| ITEM NAME 1503 | EXAMPLE: EQUAL TO | EXAMPLE: EQUAL TO | EXAMPLE: EQUAL TO OR GREATER THAN | EXAMPLE: EQUAL TO OR GREATER THAN |
| DETERMINATION CONDITION 1504 | EXAMPLE: NO OSV1 SP | EXAMPLE: NEC-HANDSET-V1 | EXAMPLE: 1000 Hz | EXAMPLE: 6.0 |
| FIRST CONDITION VALUE 1505 | EXAMPLE: OSV1 SP1 | EXAMPLE: NEC-HANDSET-V2 | EXAMPLE: - | EXAMPLE: - |
| SECOND CONDITION VALUE 1506 | EXAMPLE: OSV1 SP2 | EXAMPLE: NEC-HANDSET-V3 | EXAMPLE: - | EXAMPLE: - |
| THIRD CONDITION VALUE 1507 | | | | |

FIG.16

SUPPORT CONDITION TABLE 003 WITHIN APPLICATION

| | EXAMPLE: TABLE 003 | | | |
|---|---|---|---|---|
| TABLE NUMBER 1601 | | | | |
| ITEM NUMBER 1602 | EXAMPLE: 1 | EXAMPLE: 2 | EXAMPLE: 3 | EXAMPLE: 4 |
| ITEM NAME 1603 | EXAMPLE: OS | EXAMPLE: SET SOUND SOURCE | EXAMPLE: CPU CLOCK | EXAMPLE: BROWSER VERSION |
| DETERMINATION CONDITION 1604 | EXAMPLE: EQUAL TO | EXAMPLE: EQUAL TO | EXAMPLE: EQUAL TO OR GREATER THAN | EXAMPLE: EQUAL TO OR GREATER THAN |
| FIRST CONDITION VALUE 1605 | EXAMPLE: OSV1 SP1 | EXAMPLE: NEC-HANDSET-V2 | EXAMPLE: 1000 Hz | EXAMPLE: 7.0 |
| SECOND CONDITION VALUE 1606 | EXAMPLE: OSV1 SP2 | EXAMPLE: NEC-HANDSET-V3 | EXAMPLE: - | EXAMPLE: - |

US 9,449,155 B2

ENVIRONMENTAL CONDITION IDENTIFYING TYPE LICENSE CONSUMPTION SYSTEM AND METHOD, AND FUNCTION PROVIDING SERVER AND PROGRAM

CROSS REFERENCE TO RELATED APPLICATIONS

This application is a National Stage of International application Ser. No. PCT/JP2011/070693, filed on Sep. 12, 2011, which claims priority from Japanese Patent Application No. 2010-217179, filed on Sep. 2, 2010, the contents of all of which are incorporated herein by reference in their entirety.

TECHNICAL FIELD

The present invention relates to a license consumption of application software to be embedded into an information device.

BACKGROUND ART

Recently, a variety of application software (hereinafter, referred to as "application") operating on an information device, with a focus on a personal computer (hereinafter, referred to as "PC"), has been sold. The selling tool has gradually changed from technique of selling an application stored as package software in a recording medium, such as a CD-ROM, to technique of allowing an application to be downloaded for free through a network, such as Internet, due to superiority in terms of distribution costs and version management, and selling a license key code (hereinafter, referred to as "license") for starting the application.

Also, since licenses are sold based on function units of an application, instead of validating all functions of the application as one license, the license of the basic function is provided at low cost, so that initial introduction costs are maximally reduced. Therefore, many users are allowed to purchase and use the license. By gradually allowing the users to separately purchase individual licenses of additional functions, selling techniques of raising the lowest level of total sales have been actively carried out.

Alternatively, a company user may utilize a usage method in which a plurality of licenses are purchased in batch and registered in a server, and a license is obtained from the server when the application or function is used in an information device of an application user among employees of an office.

An example of such a technique is disclosed in Patent Literature 1. The technique disclosed in Patent Literature 1 is directed to easily realize license management of various kinds of software products which are used by a plurality of employees of a customer company. Specifically, the management is performed by providing an agent and a management center. The agent is provided at each user terminal of a customer and enables the software product to be used on a user terminal, in which the software product is installed, by starting the software product based on a unique license key. The management center manages the number of issued licenses of the corresponding customer in response to a key issue request from the customer's user terminal, creates a license key unique to the user terminal, and returns and keeps the license key.

CITATION LIST

Patent Literature

{PTL 1} JP-A-2006-059163

SUMMARY OF INVENTION

Technical Problem

As described above, the application selling method and application managing method have met a seller or user's needs in various manners. However, when managing the license of the application, the following problems may arise.

An operating system (hereinafter, referred to as "OS") of an information device, such as a PC, or hardware/peripheral devices are of great variety. Even though a new OS or peripheral devices are released, the new OS or peripheral devices cannot immediately cope with the application side. Therefore, even though the license is purchased, an application may not operate, or additional function may not operate.

In particular, when a problem occurs in an OS or peripheral devices released after the application is sold, the application cannot be normally used in the OS or peripheral devices. Nevertheless, if the application is not updated, the application may consume the license even in a PC using such OS or peripheral devices. In such a case, the purchased license may become useless.

Also, like the technique disclosed in Patent Literature 1, in the case of utilizing the usage method in which the license is obtained from the server when the application or function is used in the information device of the application user among the employees of the office, the information device which does not satisfy the operating condition of the application may consume the license. Therefore, another information device may not obtain the license.

These problems can be solved if the application is updated with the latest application. However, in general, even when the user additionally purchases the license, the application may not be updated with the latest application. Also, it may take time to develop a new application. Therefore, it is impossible to cope with the case where the user purchases the license in between.

Therefore, the present invention is directed to provide an environmental condition identifying type license consumption system and method, and a function providing server and program, which can prevent unnecessary license consumption when starting an application or validating a function thereof.

Solution to Problem

According to a first aspect of the present invention, there is provided a license consumption system including: an information device on which application software operates based on a given license; and a function providing server which grants the license to the information device, wherein the function providing server stores the license and an operating condition for granting the license, when attempting to start the application software, the information device transmits to the function providing server a licensing request of the application software and an operating environment of the information device, and the function providing server compares an operating condition of the application software corresponding to the requested license with the operating environment of the information device, and grants the license to the information device when the operating environment satisfies the operating condition.

According to a second aspect of the present invention, there is provided a function providing server which is connected to an information device, on which application software operates based on a given license, and grants the license to the information device, the function providing server including: a storage unit which stores the license and an operating condition for granting the license; and a communication unit which receives a licensing request of the application software and an operating environment of the information device, which are transmitted from the information device when attempting to start the application software, wherein an operating condition of the application software corresponding to the requested license is compared with the operating environment of the information device, and the license is granted to the information device when the operating environment satisfies the operating condition.

According to a third aspect of the present invention, there is provided a license consumption method which is performed by a system including an information device on which application software operates based on a given license, and a function providing server which grants the license to the information device, the license consumption method including: by the function providing server, storing the license and an operation condition for granting the license; when the information device attempts to start the application software, transmitting to the function providing server a licensing request of the application software and an operating environment of the information device; and by the function providing server, comparing an operating condition of the application software corresponding to the requested license with the operating environment of the information device, and granting the license to the information device when the operating environment satisfies the operating condition.

According to a fourth aspect of the present invention, there is provided a function providing program to be mounted on a server which is connected to an information device, on which application software operates based on a given license, and grants the license to the information device, the function providing program causing a computer to function as a server including: a storage unit which stores the license and an operating condition for granting the license; and a communication unit which receives a licensing request of the application software and an operating environment of the information device, which are transmitted from the information device when attempting to start the application software, an operating condition of the application software corresponding to the requested license is compared with the operating environment of the information device, and the license is granted to the information device when the operating environment satisfies the operating condition.

Advantageous Effects of the Invention

According to the present invention, a server side which issues the license is provided with a unit which checks whether the information device satisfies the operating condition of the application or function when starting the application or validating the function thereof. The license is not issued to an information device which does not satisfy the operating condition.

Therefore, even in the case of using an OS or peripheral device having a problem in a function operation, which has been released after the application is sold, it is possible to prevent unnecessary license consumption by updating only the license server side, even though the application is not updated.

BRIEF DESCRIPTION OF DRAWINGS

FIG. 5 A figure illustrates an example of a license support information table according to the embodiment of the present invention.

FIG. 6 A figure illustrates an example of a license support condition table according to the embodiment of the present invention.

FIG. 7 A figure illustrates an example of a license support condition table according to the embodiment of the present invention.

FIG. 8 A figure illustrates an example of an information device environment table according to the embodiment of the present invention.

FIG. 12 A figure illustrates an example of a licensing error display according to the embodiment of the present invention.

FIG. 14 A figure illustrates an example of a license support condition table within the application software according to the embodiment of the present invention.

FIG. 15 A figure illustrates an example of a license support condition table within the application software according to the embodiment of the present invention.

FIG. 16 A figure illustrates an example of a license support condition table within the application software according to the embodiment of the present invention.

Figure 1:
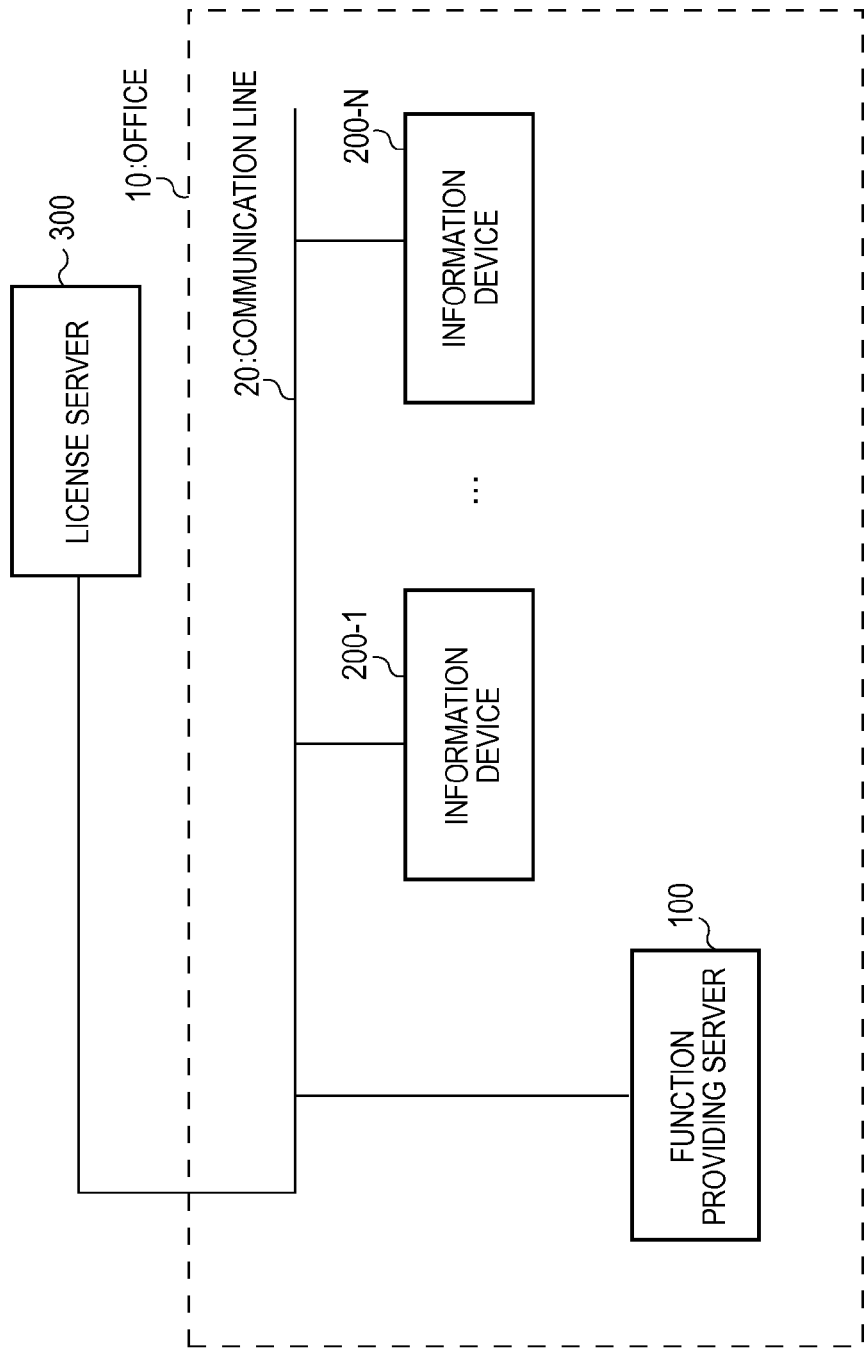
FIG. 1 A figure illustrates a basic configuration of an entire embodiment of the present invention.

REFERENCE SIGNS LIST 100 function providing server
110, 120 CPU
120, 220 storage unit
121 database
130, 240 communication line I/F
140, 250 internal line
200, 200-1, 200-N information device
221 information device software
221-1 OS
221-2, 221-3 application
230 peripheral device I/F 231, 232, 233 peripheral device
300 license server

DESCRIPTION OF EMBODIMENTS

Hereinafter, embodiments of the present invention will be described in detail with reference to the drawings.

First, a configuration of an entire embodiment of the present invention will be described with reference to FIG. 1. FIG. 1 illustrates a configuration in which an information device and a function providing server which manages the information device are present inside an office through a communication line, and a license server which issues a license is present outside the office. The office is, for example, an office of a user who uses an application, and the license server 300 is a server of a software vendor who sells the application.

In the office 10, there exist a function providing server 100, an information device 200-1, and an information device 200-N, which are connected to one another through an office communication line 20. The communication line 20 may be a wired connection, and a part or all of the communication line 20 may be a wireless connection. Also, although two information devices are illustrated in FIG. 1, this is merely exemplary and any number of information devices may be connected.

The function providing server 100 is a server which performs distribution management of a license issued from the license server 300, and provides a variety of services to the information devices. The function providing server 100 communicates with the license server 300 and the information devices 200, and controls a function of the application operating on the information devices or a service provided to the application, depending on existence or nonexistence of the license or environment information of the information devices.

The information devices 200 are devices which use the application. A specific example includes a PC with embedded operating system (OS) and application.

Also, the communication line 20 is connected to the license server 300 which is present outside the office. This connection may use a public network or a private line.

Figure 2:
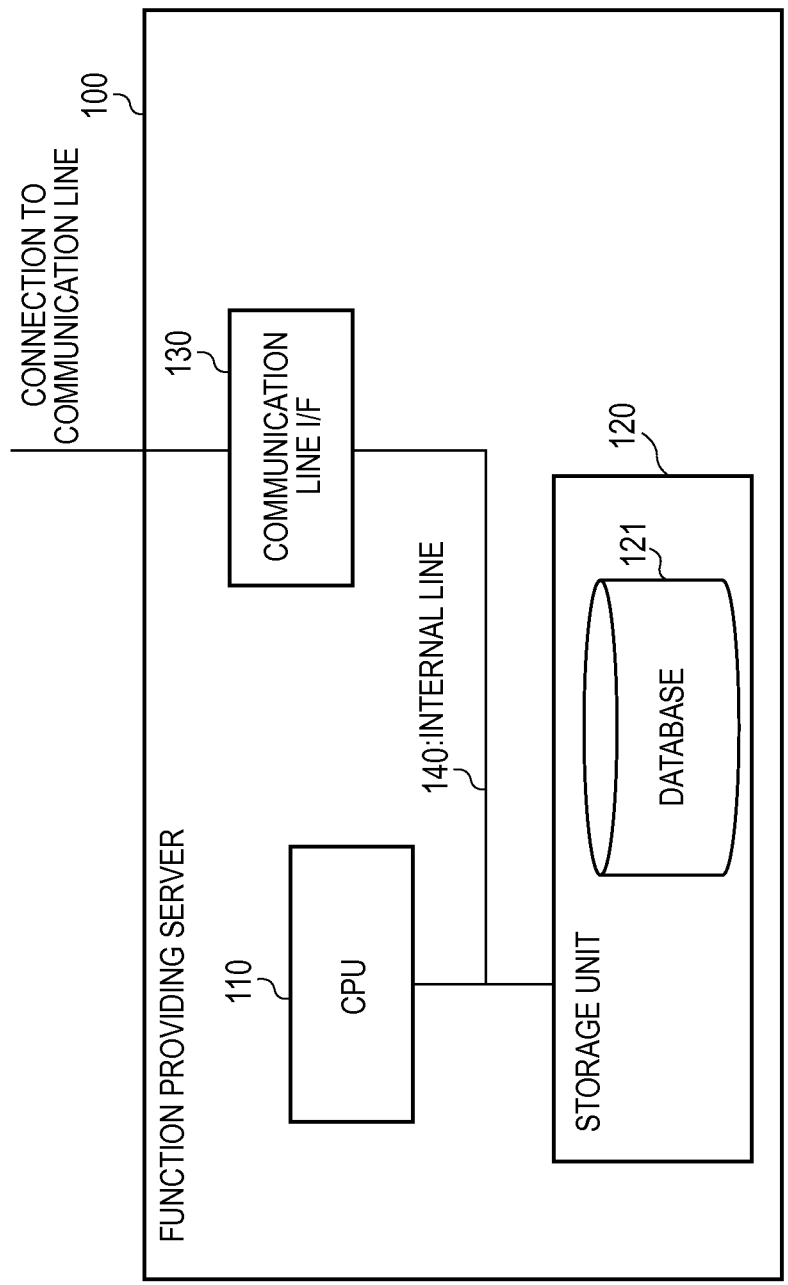
FIG. 2 A figure illustrates a basic configuration of a function providing server according to the embodiment of the present invention.

Next, the configuration of the function providing server 100 and the operation of the respective units thereof will be schematically described with reference to FIG. 2.

The function providing server 100 includes a CPU 110, a storage unit 120, and a communication line interface (I/F) 130. The respective units are connected to one another by an internal line 140. Also, the storage unit 120 includes a database 121.

The CPU 110 is a central processing unit (CPU) and is a part which controls the function providing server 100.

In general, the storage unit 120 is a storage area which is realized by a device called a main storage device, and a device called an auxiliary storage device.

The main storage device is generally realized by a storage device, such as a random access memory (RAM), which can access stored data in random order. In the embodiment, the main storage device is used as a work area when utilizing software or data necessary for the control of the function providing server 100.

Also, the auxiliary storage device is realized by a storage device, such as a hard disk drive (HDD) or a flash solid state drive (SSD). In the embodiment, the auxiliary storage device stores software or data necessary for the control of the function providing server 100, the database 121, and the like.

The database 121 is an area which holds a variety of setting data stored on the storage unit 120.

The communication line I/F 130 is an interface which performs signal transmission and reception with the communication line connection.

Figure 3:
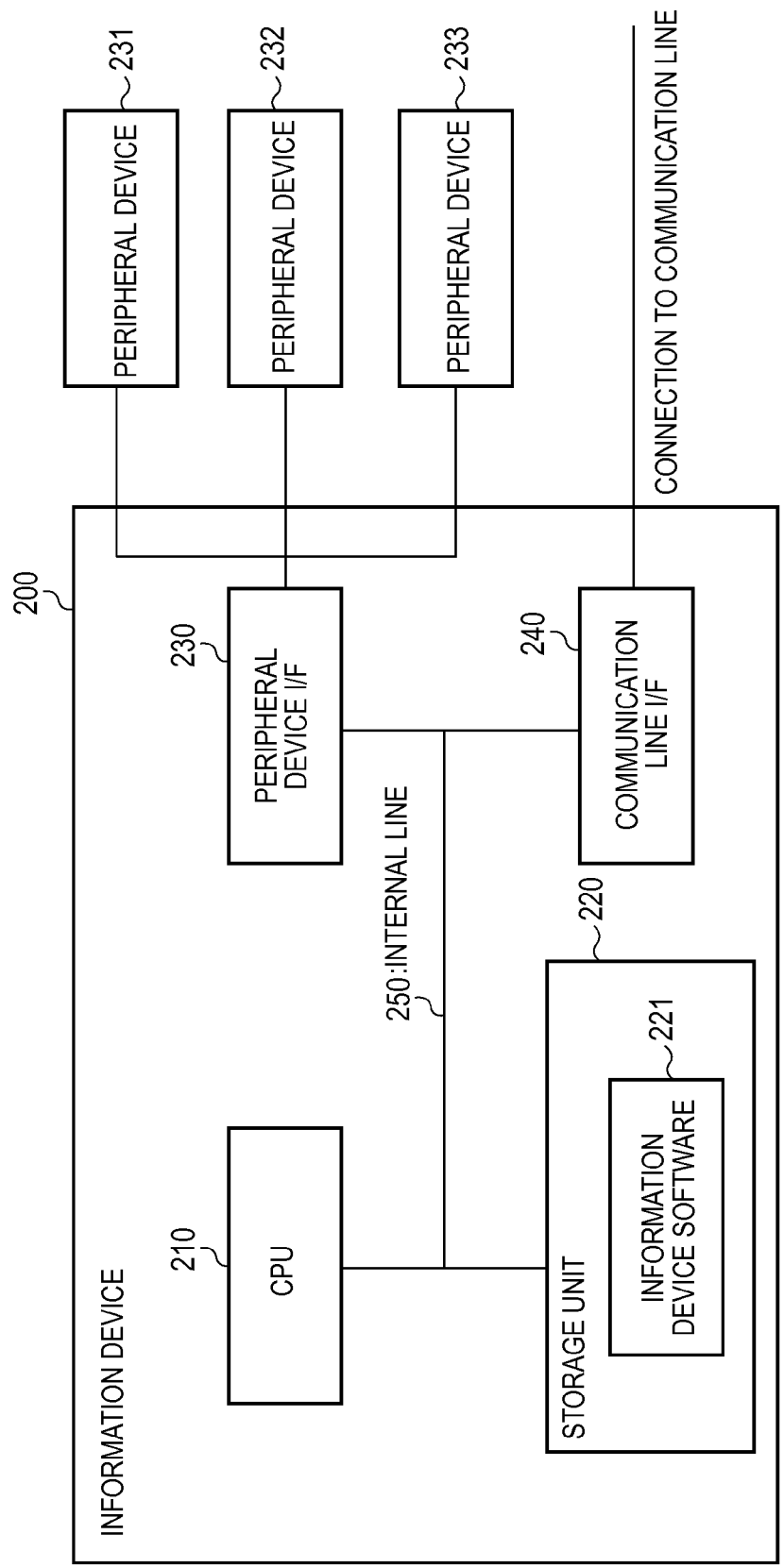
FIG. 3 A figure illustrates a basic configuration of an information device according to the embodiment of the present invention.

Next, the configuration of the information device 200 and the operation of the respective units thereof will be schematically described with reference to FIG. 3.

The information device 200 includes a CPU 210, a storage unit 220, and a peripheral device I/F 230, and a communication line I/F 240. The respective units are connected to one another by an internal line 250. Also, the storage unit 220 includes information device software 221.

The CPU 210 is a central processing unit and is a part which controls the information device 200.

The storage unit 220 is a storage area and is used similarly to the storage unit 120. Also, the information device software 221 stored in the storage unit 220 is software which operates on the storage unit 220. Detailed content of the information device software 221 will be described below.

The peripheral device I/F 230 is an interface which performs signal transmission and reception with a variety of peripheral devices connected to the information device. The peripheral device I/F 230 is connected to peripheral devices 231 to 233.

The peripheral devices 231 to 233 are peripheral devices which are used by the information device 200, and specifically, may be any devices. Also, although three peripheral devices are illustrated in FIG. 3, this is merely exemplary and any number of peripheral devices may be connected.

The communication line I/F 240 is an interface which performs signal transmission and reception with the communication line.

Also, in the respective devices described above, the CPU reads the software stored in the storage unit, and performs arithmetic processing while using a memory on the storage unit. That is, the embodiment is realized by cooperation of hardware such as the CPU or memory, various interfaces, and the like, and a program (software).

Figure 4:
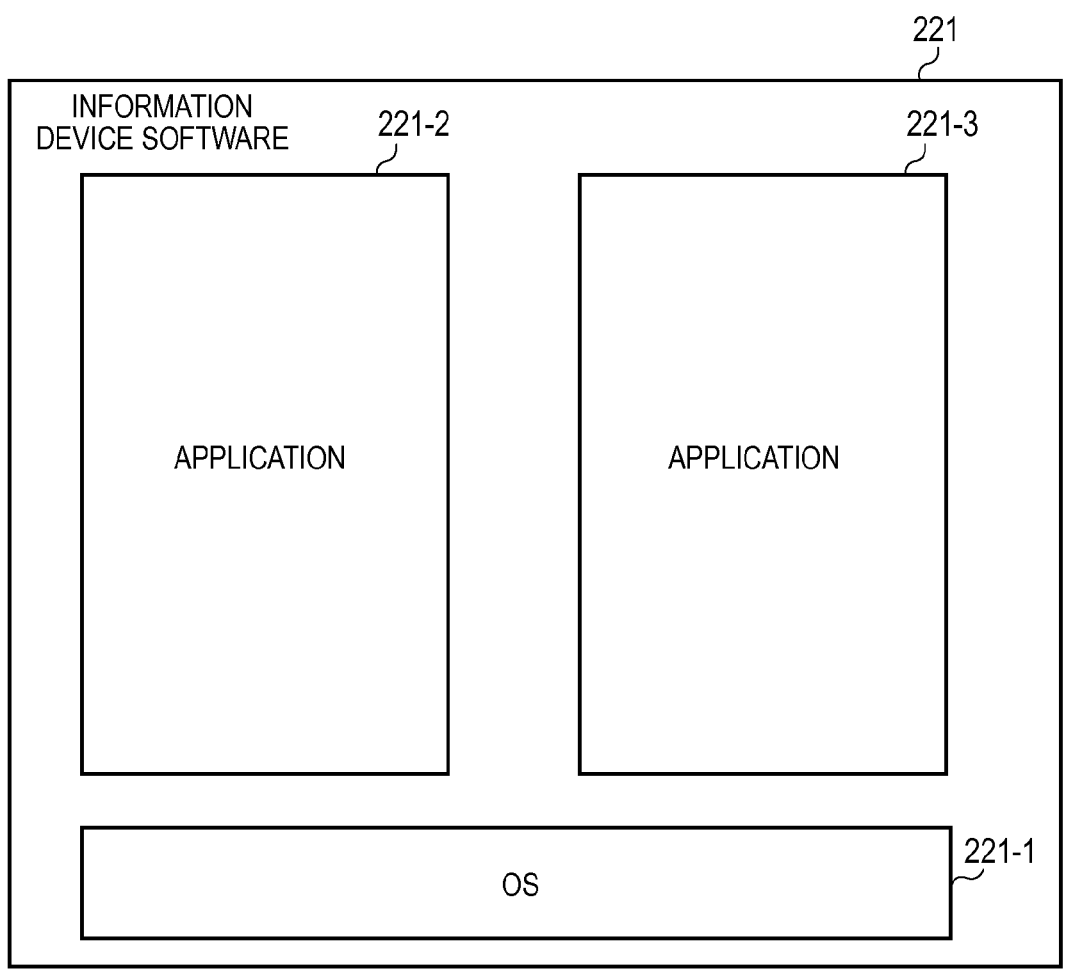
FIG. 4 A figure illustrates a basic configuration of information device software according to the embodiment of the present invention.

Next, the module configuration of the information device software 221 will be described with reference to FIG. 4. The information device software 221 includes an OS 221-1, an application 221-2, and an application 221-3.

The OS 221-1 is software which manages the entire information device 200. The OS 221-1 need not be an OS peculiar to the embodiment. For example, the OS 221-1 may be a general-purpose OS, such as Windows (registered trademark).

The application 221-2 and the application 221-3 are application software which operates on the OS 221-1. The application 221-2 and the application 221-3 may be applications for realizing a certain function. Also, although two applications are illustrated in FIG. 4, this is merely exemplary and any number of applications may be provided.

Next, tables used in the embodiment will be described with reference to FIGS. 5 to 8. Also, these tables are merely one of specific examples. The structures and contents of these tables can be arbitrarily modified without departing from the scope of the embodiment. Also, with the intention to clarify that the content of each item is merely exemplary, the description of "example:" is illustrated in each drawing.

FIG. 5 is a license support information table which stores an information device environment condition necessary for validating a license of each function, among the contents of the database 121 stored in the storage unit 120 of the function providing server 100. Also, as many license support information tables as the number of the provided/managed functions exist in the database 121.

A function number 501 stores a function number for identifying the function provided/managed by the function providing server. A function name 502 stores a name of the function. An application version 503 stores a version range of the function. A support condition table 504 stores table numbers for identifying tables defining the information device environment conditions necessary for validating the license of the function of the version range described in the relevant application version 503, with respect to each version range.

The version (also often described as "Ver.") is a notation for identifying how many times the software (application) has been revised and updated after its initial development. Even after being developed once, the software has been revised and updated for the purpose of performance improvement or correction of defects called bug or the like. In order to identify the revision and update, the notion of version is generally used.

FIGS. 6 and 7 illustrate support condition table bodies defined by the table numbers stored in the support condition table 504 described above. Similar to the license support information table, these support condition tables are stored in the database 121.

The table numbers 601 and 701 are identification numbers for association with the table numbers stored in the support condition table 504. Item numbers 602 and 702 store a number for identifying each item of the information device environment condition. Item names 603 and 703 store names of each condition item. Determination conditions 604 and 704 store determination conditions for determining a valid/invalid license of the license of each function with respect to each item, and define environment conditions together with first condition values 605 and 705, second condition values 606 and 706, and a third condition value 707.

Also, in the embodiment, the support condition table is set up to 002, the item number is set up to 4, and the condition value is set to 2 or 3, but these are increased or increased according to the environment condition of each function. Also, as one example, clock number of the CPU is set as one item. However, for example, a capacity of a mounted memory as well as the clock number of the CPU may be set as criteria.

FIG. 8 illustrates an information device environment table storing environment information obtained by each application 221-2 and 403 in the information device software 221 stored in the storage unit 220 of the information device 200. Also, the content of the information device environment table corresponds to "operating environment" of the present invention.

The information device environment table is stored on the storage unit 220 whenever the application is started. An item number 801 is an identification number corresponding to the item numbers 602 and 702 described above, and stores a number for identifying each item of the information device environment condition. An item name 802 also stores a name corresponding to the item names 603 and 703 described above. The information device environment 803 stores an actual information device environment corresponding to each item. By updating the information device environment table whenever the application is started, the latest information of the information device can be reflected to the information device environment table. For example, in the case where the application is started after the OS is upgraded, it is immediately reflected to the information device environment table that the OS has been upgraded.

Next, the operation of the embodiment will be described in detail with reference to flow charts of FIGS. 9 and 10.

This time, the following description will be given of the case where the license key code is obtained from the license server 300, the license key code is input to the function providing server 200, and the license of the "voice call" function from the application 221-2 and the application 221-3 on the information device 200 and the function provision are requested to the function providing server 100.

As a premise, the application version of the application 221-2 is assumed to be "1.0.0.0". Also, the application version of the application 221-3 is assumed to be "2.0.0.0". Also, as illustrated in the example of FIG. 8, the information device 200 uses "OS V1SP2" as the OS and sets "NEC-HANDSET-V3" as the sound source among the peripheral devices 231 to 307, the clock number of the CPU is "1000 Hz", and the version of the browser is "7.0".

First, the user obtains the license key code of the "voice call" by purchasing the license key code of the "voice call" from the license server 300 (step S901).

Subsequently, the license server 300 transmits the license key code obtained by the user to the function providing server 100 via the communication line (step S902).

The function providing server 100 decrypts the received license key code, extracts the license support information and support condition table illustrated in FIGS. 5 and 6, and stores the extracted license support information and support condition table in the database 121 on the storage unit 120 as exemplarily illustrated in 501 to 504, 601 to 606, and 701 to 707. The number of the licenses is extracted in a similar manner and is stored as an unconsumed license in another database on the storage unit 120 (step S903).

Subsequently, the user first starts the application 221-2, whose application version is "1.0.0.0", on the information device 200 (step S1001).

On the storage unit 220, the application 221-2 creates the information device environment table illustrated in FIG. 8 in a state in which data is not stored in the information device environment 803. The application 221-2 obtains OS information by inquiring of the OS 221-1, and stores the OS information "OS V1SP2" in the information device environment 803 of the area, whose item number 801 is "1".

Also, the application 221-2 stores the set sound source information "NEC-HANDSET-V3" in the information device environment 803 of the area, whose item number 801 is "2", with reference to its own setting information. Furthermore, the application 221-2 obtains CPU information by inquiring of the OS 221-1, and stores the CPU clock information "1000 Hz" in the information device environment 803 of the area, whose item number 801 is "3". Furthermore, the application 221-2 obtains browser information by inquiring of the OS 221-1, and stores the browser version information "7.0" in the information device environment 803 of the area, whose item number 801 is "4".

The application 221-2 transmits the information device environment table storing the above information to the function providing server 100 via the communication line (step S1002).

The function providing server 100 having received the information device environment table stores the information device environment table as temporary data.

Subsequently, the application 221-2 checks the necessary license with reference to its own setting, and as a result, transmits the license request of the function number "function 001" (which is represented by "function number X" in the drawing) of the necessary license "voice call" function to the function providing server 100 together with its own application version "1.0.0.0" (which is represented by "function number Y" in the drawing) (step S1003).

The function providing server 100 having received the license request of the function number "function 001" and the application version "1.0.0.0" first makes reference to the database as to whether the unconsumed license of the function number "function 001" exists. In the embodiment, it is assumed that one unconsumed license exists. Since the unconsumed license exists, "1.0.0.0" of the application version 503 of the area of the function number "function 001" of the license support information table finds the corresponding area.

Since "1.0.0.0" is not less than "1.0.0.0", is not greater than "1.0.0.0" and less than "2.0.0.0", is not "2.0.0.0", and is not greater than "2.0.0.0", "1.0.0.0" of the application version 503 makes reference to the support condition table 504 of the corresponding range and makes reference to "table 001" stored therein.

FIG. 6 stores information illustrated in "table 001", and the function providing server 100 performs comparison with the information device environment table of the information device 200 (see FIG. 8) stored as the above-described temporary data.

The function providing server 100 reads, from the information stored in "table 001" illustrated in FIG. 6, the support condition, the condition that the item number "1" and the item name "OS" are "no OS 1SP" and "same", the condition that the item number "1" and the item name "OS" are "OSV1 SP1" and "same", the condition that the item number "2" and the item name "set sound source" are "NEC-HANDSET-V1" and "same", the condition that the item number "2" and the item name "set sound source" are "NEC-HANDSET-V2" and "same", the condition that the item number "3" and the item name "CPU clock" are "800 Hz" and "above", and the condition that the item number "4" and the item name "browser version" are "6.0" and "above".

As a result of comparison with the information device environment table of the information device 200 (see FIG. 8), it is determined that the conditions of the item number "1" and the item number "2" are not satisfied (NO in step S1004).

Figure 11:
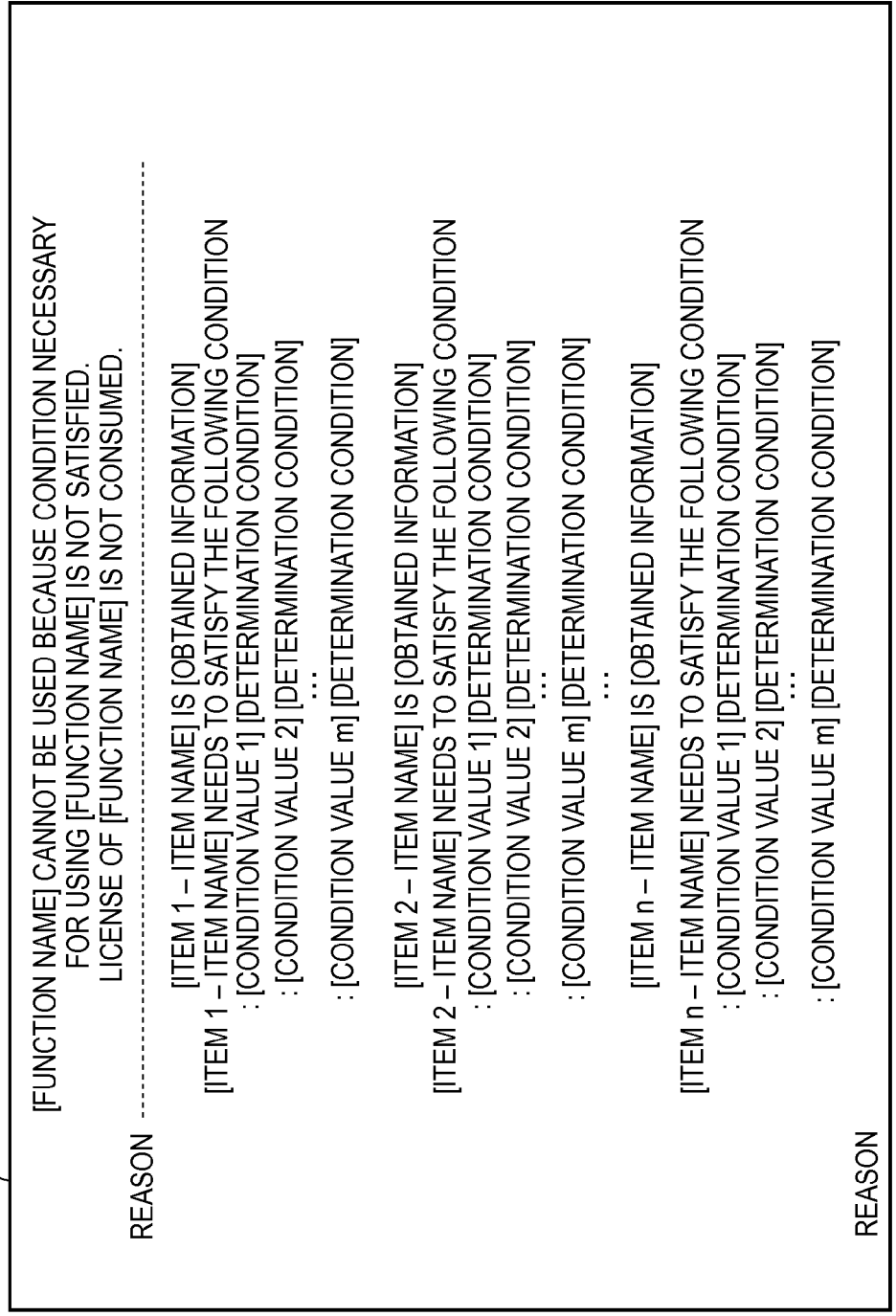
FIG. 11 A figure illustrates an example of a licensing error display according to the embodiment of the present invention.

The function providing server 100 transmits, to the information device 200, licensing failure result notification and information about which condition is not satisfied. The application 221-2 on the information device 200 generates an error display illustrated in FIG. 11, based on the information. As a result, an error message is displayed as illustrated in FIG. 12 (step S1007). Also, the error display illustrated in FIGS. 11 and 12 is merely exemplary, and specific wording can be arbitrary.

When another license also is a necessary setting (YES in step S1008), the application 221-2 continuously performs another license request (step S1003). However, in the embodiment, since only the "voice call" license is needed, licensing processing is ended (NO in step S1008, step S1008).

Subsequently, the user starts the application 221-3, whose application version is "2.0.0.0", on the information device 200 (step S1001).

On the storage unit 220, the application 221-3 creates the information device environment table illustrated in FIG. 8 in a state in which data is not stored in the information device environment 803. The application 221-3 obtains OS information by inquiring of the OS 221-1, and stores the OS information "OS V1SP2" in the information device environment 803 of the area, whose item number 801 is "1". Also, the application 221-3 stores the set sound source information "NEC-HANDSET-V3" in the information device environment 803 of the area, whose item number 801 is "2", with reference to its own setting information. Furthermore, the application 221-3 obtains CPU information by inquiring of the OS 221-1, and stores the CPU clock information "1000 Hz" in the information device environment 803 of the area, whose item number 801 is "3". Furthermore, the application 221-3 obtains browser information by inquiring of the OS 221-1, and stores the browser version information "7.0" in the information device environment 803 of the area, whose item number 801 is "4".

The application 221-3 transmits the information device environment table storing the above information to the function providing server 100 via the communication line (step S1002).

The function providing server 100 having received the information device environment table stores the information device environment table as temporary data of the storage unit 120.

The application 221-3 checks the necessary license with reference to its own setting, and as a result, transmits the license request of the function number "function 001" of the necessary license "voice call" function to the function providing server 100 together with its own application version "2.0.0.0" (step S1003).

The function providing server 100 having received the license request of the function number "function 001" and the application version "2.0.0.0" first makes reference to the database as to whether the unconsumed license of the function number "function 001" exists. In the embodiment, since one unconsumed license exists, "2.0.0.0" of the application version 503 of the area of the function number "function 001" of the license support information table finds the corresponding area.

Since "2.0.0.0" is not less than "1.0.0.0", is not greater than "1.0.0.0" and less than "2.0.0.0", is "2.0.0.0", and is not greater than "2.0.0.0", "2.0.0.0" of the application version 503 of the area makes reference to the support condition table 504 of the corresponding range and makes reference to "table 002" stored therein.

FIG. 6 stores information illustrated in "table 002", and the function providing server 100 performs comparison with the information device environment table of the information device 200 (see FIG. 8) stored as the above-described temporary data.

The function providing server 100 reads, from the information stored in "table 002" illustrated in FIG. 6, the support condition, the condition that the item number "1" and the item name "OS" are "no OSV1SP" and "same", the condition that the item number "1" and the item name "OS" are "OS V1SP1" and "same", the condition that the item name "OS" is "OS V1SP2" and "same", the condition that the item number "2" and the item name "set sound source" are "NEC-HANDSET-V1" and "same", the condition that the item number "2" and the item name "set sound source" are "NEC-HANDSET-V2" and "same", the condition that the item number "2" and the item name "set sound source" is "NEC-HANDSET-V3" and "same", the condition that the item number "3" and the item name "CPU clock" are "1000 Hz" and "above", and the condition that the item number "4" and the item name "browser version" are "6.0" and "above".

As a result of comparison with the information device environment table of the information device 200 (see FIG. 8), it is determined that the conditions of all item numbers are satisfied (YES in step S1004).

The function providing server 100 changes one license of the "voice call" function stored in the database from an unconsumed state to a consumed state (step S1005).

The function providing server 100 transmits licensing success result notification to the information device 200 and starts to provide the "voice call" function to the information device 200. When receiving the success result notification, the application 221-3 on the information device 200 validates the "voice call" function (step S1006).

When another license also is a necessary setting (YES in step S1008), the application 221-3 continuously performs another license request (step S1003). However, in the embodiment, since only the "voice call" license is needed, licensing processing is ended (NO in step S1008, step S1008).

Even when it is found by the above-described embodiment that after the user purchased the application, new OS or peripheral device are released, and also, the function does not operate on the new OS or peripheral device, it is possible to obtain the effect that the function license is not unnecessarily consumed by the information device application having not satisfied the function operation condition by just updating the license server side, without updating the application.

Also, even when the user additionally purchases the license, the application may not be updated with the latest application. However, since the license server is generally managed and operated by a product provider side, the license server can be immediately updated in many cases. Therefore, the above effect is more remarkable.

Next, a first modification of the above-described embodiment will be described.

In the above-described embodiment, only at the time when the license key code purchased from the license server 300 is input to the function providing server 100, the license support information table of FIG. 5 and the support condition tables of FIGS. 6 and 7 are recorded by the information inside the license key code. However, the function providing server 100 may periodically communicate with the license server 300 to automatically update the tables.

Figure 9:
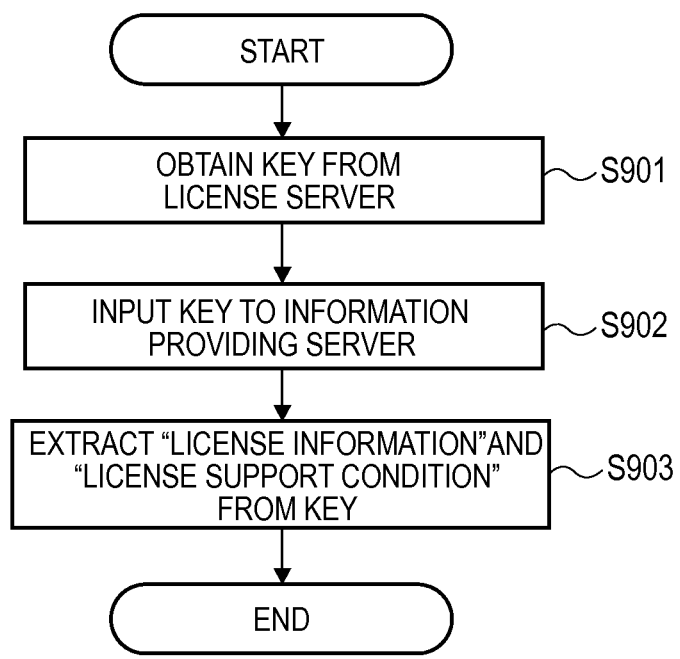
FIG. 9 A FIG. (1/2) illustrates a basic operation of the embodiment of the present invention.

In this case, after steps S901 to S903 in the flowchart of FIG. 9 are performed, the following processing is performed at arbitrary regular intervals. Also, there is no change in the processing of the other steps.

First, the function providing server 100 transmits the function numbers of all holding licenses (unconsumed and consumed), which are currently recorded in the database, to the license server 300 as the support condition update request via the communication line.

When receiving the support condition update request, the license server 300 transmits, to the function providing server 100, information corresponding to the license support information table of FIG. 5 and the support condition tables of FIGS. 6 and 7, which correspond to all the received function numbers.

The function providing server 100 overwrites and stores the received license support information and support condition tables illustrated in FIGS. 5 and 6 on 501 to 504, 601 to 606, and 701 to 707. Furthermore, in addition to the overwrite of the support condition table, a new support condition table may be added.

Therefore, even when it is found that after the user purchased the license key code, new OS or peripheral device are released, and also, the function does not operate on the new OS or peripheral device, it is possible to prevent unnecessary license consumption by just updating only the information of the license server side, without the user's manually updating the support information table and the support condition tables of the function providing server 100.

Next, a second modification of the above-described embodiment will be described.

In the above-described embodiment, only at the time when the license key code purchased from the license server 300 is input to the function providing server 100, the license support information table of FIG. 5 and the support condition tables of FIGS. 6 and 7 are recorded. However, the tables may be previously recorded within the applications 221-2 and 221-3, and the applications may be transmitted to the function providing server 100 when the applications are started.

The operation of the second modification will be described with an example in which the version of the application 221-3 is "3.0.0.0".

Figure 10:
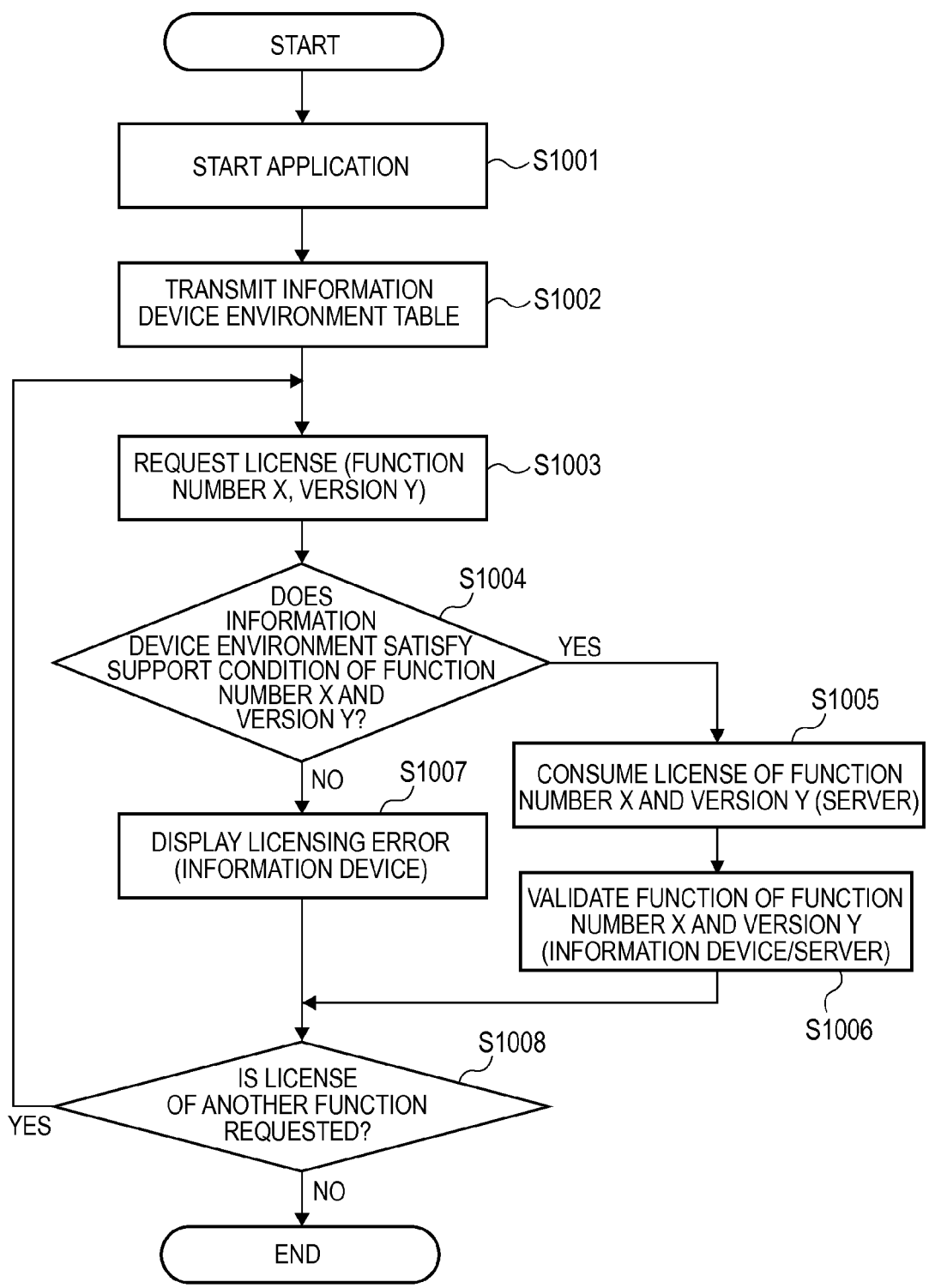
FIG. 10 A FIG. (2/2) illustrates a basic operation of the embodiment of the present invention.

The following processing is performed between step S1001 and step S1002 of FIG. 10.

Figure 13:
FIG. 13 A figure illustrates an example of a license support information table within application software according to the embodiment of the present invention.

The application 221-3 transmits its own application version, and the license support information table of FIG. 13 and the support condition tables of FIGS. 14, 15 and 16, which are required by the application 221-3, to the function providing server 100 as the support condition update request.

The function providing server 100 having received the support condition update request makes reference to the application version 503 of the license support information table of FIG. 5 which is in a state of being recorded in the database. Since the greatest version recorded therein is "2.0.0.0" and is less than the greatest version "3.0.0.0" recorded in the license support information table of FIG. 13 notified by the application 221-3, the function providing server 100 determines the received information side as new. The function providing server 100 deletes the license support information table of FIG. 5 and the support condition tables of FIGS. 6 and 7. Instead, the function providing server 100 stores the license support information table of FIG. 13 and the support condition tables of FIGS. 14, 15 and 16.

The subsequent processing is not different from the above-described embodiment, except that at the time of checking the support conditions, the support conditions checked by the function providing server are changed to the license support information table of FIG. 13 and the support condition tables of FIGS. 14, 15 and 16.

This is the case where the support condition is changed, such as the case where the application version is up. Even when the support condition stored in the license server 300 or the function providing server 100 remains old, a new support condition can be applied by updating only one application among the applications used by the user. Therefore, the function is executed in an environment where the license is unnecessarily consumed or is not supported.

Also, the function providing server, the information device, and the license server according to the embodiment of the present invention may also be realized by hardware. However, the embodiment of the present invention can also be realized in such a manner that a computer reads a program for causing the computer to function as the function providing server, the information device, and the license server from a computer-readable recording medium and executes the read program.

Also, the environmental condition identifying type license consumption method according to the embodiment of the present invention may also be realized by hardware. However, the embodiment of the present invention can also be realized in such a manner that a computer reads a program for executing the method on the computer from a computer-readable recording medium and executes the read program.

Furthermore, it has been described in the embodiment that the program peculiar to the embodiment is prestored in the function providing server, the information device, and the license server. However, the program for causing the computer to operate as all or part of the function providing server, the information device, and the license server, or executing the above-described processing is distributed while being stored in a computer-readable recording medium, such as a flexible disk, a compact disc read-only memory (CD-ROM), a digital versatile disc (DVD), a magneto optical disk (disc) (MO), and a Blu-ray Disc (BD). By installing the program in another computer, the computer may be operated as the above-described means, or the above-described processing may be executed. Furthermore, the program may be stored in a disk device owned by a server apparatus on the Internet, and, for example, by superimposing the program on a carrier wave, the program may be downloaded to the computer and then executed.

Also, the above-described embodiment is a preferred embodiment of the present invention, but the scope of the present invention is not limited to only the embodiment. Various modifications can be made without departing from the scope of the present invention.

This application is based upon and claims the priority of Japanese Patent Application No. 2010-217179, filed on Sep. 28, 2010, the disclosure of which is hereby incorporated by reference in its entirety.

Although the exemplary embodiments of the present invention have been described in detail, it should be understood that various changes, substitutions, and alternatives can be made therein without departing from the spirit and scope of the invention as defined by the appended claims. Furthermore, it is the inventor's intent to retain all equivalents of the claimed invention even if the claims are amended during prosecution.

Part or all of the embodiments can be described as the following supplementary notes, but are not limited to the following.

{Supplementary Note 1} A license consumption system including: an information device on which application software operates based on a given license; and a function providing server which grants the license to the information device, wherein the function providing server stores the license and an operating condition for granting the license, when attempting to start the application software, the information device transmits to the function providing server a licensing request of the application software and an operating environment of the information device, and the function providing server compares an operating condition of the application software corresponding to the requested license with the operating environment of the information device, and grants the license to the information device when the operating environment satisfies the operating condition.

{Supplementary Note 2} The license consumption system described in Supplementary Note 1, wherein the operating condition is changeable even for the same application software according to a version of the application software.

{Supplementary Note 3} The license consumption system described in Supplementary Note 1 or 2, wherein the license exists at respective functions of the application software, and when attempting to validate any one of the functions, a licensing request of application software having the corresponding function and an operating environment of the corresponding information device are transmitted to the function providing server.

{Supplementary Note 4} The license consumption system described in any one of Supplementary Notes 1 to 3, wherein, in the comparison, when the operating environment does not satisfy the operating condition, information indicating which operating condition is mismatched within the operating condition is displayed on the information device.

{Supplementary Note 5} The license consumption system described in any one of Supplementary Notes 1 to 4, wherein the function providing server periodically communicates with exterior to check whether the operating condition is not changed, and rewrites the stored operating condition to the changed operating condition when it is checked that the operating condition is changed.

{Supplementary Note 6} The license consumption system described in any one of Supplementary Notes 1 to 5, wherein the information device is provided in plurality, and when one of the plurality of information devices updates the application software, the operating condition for the information devices other than the corresponding information device is also rewritten.

{Supplementary Note 7} The license consumption system described in any one of Supplementary Notes 1 to 6, wherein the application software stores an operating condition for granting the license, when attempting to start the application software, the information device transmits to the function providing server the operating condition of the application software, a licensing request of the application software, and an operating environment of the information device, and the function providing server compares the operating condition stored therein with the operating condition received from the information device, and rewrites the stored operating condition to the received operating condition when the comparison result shows that the received operating condition is new.

{Supplementary Note 8} A function providing server which is connected to an information device, on which application software operates based on a given license, and grants the license to the information device, the function providing server including: a storage unit which stores the license and an operating condition for granting the license; and a communication unit which receives a licensing request of the application software and an operating environment of the information device, which are transmitted from the information device when attempting to start the application software, wherein an operating condition of the application software corresponding to the requested license is compared with the operating environment of the information device, and the license is granted to the information device when the operating environment satisfies the operating condition.

{Supplementary Note 9} A license consumption method which is performed by a system including an information device on which application software operates based on a given license, and a function providing server which grants the license to the information device, the license consumption method including: by the function providing server, storing the license and an operation condition for granting the license; when the information device attempts to start the application software, transmitting to the function providing server a licensing request of the application software and an operating environment of the information device; and by the function providing server, comparing an operating condition of the application software corresponding to the requested license with the operating environment of the information device, and granting the license to the information device when the operating environment satisfies the operating condition.

{Supplementary Note 10} The license consumption method described in Supplementary Note 9, wherein the operating condition is changeable even for the same application software according to a version of the application software.

{Supplementary Note 11} The license consumption method described in Supplementary Note 9 or 10, wherein the license exists at respective functions of the application software, and when the information device attempts to validate any one of the functions, a licensing request of application software having the corresponding function and an operating environment of the corresponding information device are transmitted to the function providing server.

{Supplementary Note 12} The license consumption method described in any one of Supplementary Notes 9 to 11, wherein, in the comparison, when the operating environment does not satisfy the operating condition, information indicating which operating condition is mismatched within the operating condition is displayed on the information device.

{Supplementary Note 13} The license consumption method described in any one of Supplementary Notes 9 to 12, wherein the function providing server periodically communicates with exterior to check whether the operating condition is not changed, and rewrites the stored operating condition to the changed operating condition when it is checked that the operating condition is changed.

{Supplementary Note 14} The license consumption method described in any one of Supplementary Notes 9 to 13, wherein the information device is provided in plurality, and when one of the plurality of information devices updates the application software, the operating condition for the information devices other than the corresponding information device is also rewritten.

{Supplementary Note 15} The license consumption method described in any one of Supplementary Notes 9 to 14, wherein the application software stores an operating condition for granting the license, when attempting to start the application software, the information device transmits to the function providing server the operating condition of the application software, a licensing request of the application software, and an operating environment of the information device, and the function providing server compares the operating condition stored therein with the operating condition received from the information device, and rewrites the stored operating condition to the received operating condition when the comparison result shows that the received operating condition is new.

{Supplementary Note 16} A function providing program to be mounted on a server which is connected to an information device, on which application software operates based on a given license, and grants the license to the information device, the function providing program causing a computer to function as a server including: a storage unit which stores the license and an operating condition for granting the license; and a communication unit which receives a licensing request of the application software and an operating environment of the information device, which are transmitted from the information device when attempting to start the application software, an operating condition of the application software corresponding to the requested license is compared with the operating environment of the information device, and the license is granted to the information device when the operating environment satisfies the operating condition.

The invention claimed is:

1. A license consumption system comprising:
a plurality of information devices each comprising application software that operates based on a given license; and
a function providing server comprising a non-transitory computer-readable storage device with computer-executable instructions stored thereon that, when executed by one or more computer processors, cause the one or more computer processors to perform operations comprising:
storing the license and a first operating condition for granting the license, wherein the license and first operating condition are received from a license server that stores a managed operating condition, wherein the first operating condition comprises a condition of a configuration of hardware and software required by an information device within the plurality of information devices to successfully start the application software;
sending the first operating condition to the information device;
receiving, from the information device when the information device starts the application software, a licensing request of the application software, information on the configuration of hardware and software of the information device, and a second operating condition for granting the license, wherein the application software comprises the second operating condition for granting the license;
comparing the first operating condition stored therein with the second operating condition received from the information device;
rewriting the stored first operating condition with a content of the received second operating condition when the comparison result shows that the received second operating condition is for a newer version of the application software, wherein the second operating condition comprises a condition of a configuration of hardware and software required by the information device to successfully start the application software;
comparing the stored first operating condition of the application software corresponding to the requested license with the information on the configuration of hardware and software of the information device, wherein the stored first operating condition is the original first operating condition if the stored first operating condition is not rewritten and is the rewritten first operating condition if the stored first operating is rewritten;
granting the license to the information device when the operating environment satisfies the stored first operating condition;
communicating periodically with the license server to check whether the managed operating condition is changed; and
rewriting the stored first operating condition to the changed managed operating condition when the check result shows that the managed operating condition is changed.

2. The license consumption system according to claim 1, wherein, the license exists at respective functions of the application software.

3. The license consumption system according to claim 1, wherein, in the comparison between the stored first operating condition and the operating environment of the information device, when the operating environment does not satisfy the stored first operating condition, information indicating which operating condition is mismatched within the stored first operating condition is displayed on the information device.

4. A license consumption method which is performed by a system including a plurality of information devices each comprising application software that operates based on a given license, and a function providing server which grants the license to the plurality of information devices, the license consumption method comprising the function providing server performing the acts comprising:

storing the license and a first operating condition for granting the license, wherein the license and first operating condition are received from a license server that stores a managed operating condition, wherein the first operating condition comprises a condition of a configuration of hardware and software required by an information device within the plurality of information devices to successfully start the application software;

sending the first operating condition to the information device;

receiving, from the information device when the information device starts the application software, a licensing request of the application software, information on the configuration of hardware and software of the information device, and a second operating condition for granting the license, wherein the application software comprises the second operating condition for granting the license;

comparing the first operating condition stored therein with the second operating condition received from the information device;

rewriting the stored first operating condition with a content of the received second operating condition when the comparison result shows that the received second operating condition is for a newer version of the application software, wherein the second operating condition comprises a condition of a configuration of hardware and software required by the information device to successfully start the application software;

comparing the stored first operating condition of the application software corresponding to the requested license with the information on the configuration of hardware and software of the information device, wherein the stored first operating condition is the original first operating condition if the stored first operating condition is not rewritten and is the rewritten first operating condition if the stored first operating is rewritten;

granting the license to the information device when the operating environment satisfies the stored first operating condition;

communicating periodically with the license server to check whether the managed operating condition is changed; and rewriting the stored first operating condition to the changed managed operating condition when the check result shows that the managed operating condition is changed.

* * * * *

UNITED STATES PATENT AND TRADEMARK OFFICE
CERTIFICATE OF CORRECTION

| | | |
|---|---|---|
| PATENT NO. | : 9,449,155 B2 | Page 1 of 1 |
| APPLICATION NO. | : 13/820683 | |
| DATED | : September 20, 2016 | |
| INVENTOR(S) | : Yasuomi Ooki | |

It is certified that error appears in the above-identified patent and that said Letters Patent is hereby corrected as shown below:

In the Specification

Column 4, Line 58:
"120" has been replaced with --210--

Column 7, Line 49:
"403" has been replaced with --221-3--

Column 8, Line 8:
"200," has been replaced with --100,--

Column 8, Line 18:
"307," has been replaced with --233,--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*